United States Patent [19]

Olszewski et al.

[11] 4,286,121
[45] Aug. 25, 1981

[54] TELEPHONE LINE CUTOVER APPARATUS AND SWITCH

[75] Inventors: Edward J. Olszewski, Ottawa; Dieter H. Hundrieser, Manotick; Harold J. Ostapovitch, Lachine, all of Canada

[73] Assignee: Northern Telecom Limited, Montreal, Canada

[21] Appl. No.: 88,011

[22] Filed: Oct. 25, 1979

[51] Int. Cl.³ .............................................. H04Q 1/14
[52] U.S. Cl. ................................. 179/98; 200/153 M; 200/61.19; 361/399
[58] Field of Search ................... 179/98, 1 SW, 1 PC; 200/61.19, 153 M; 361/351, 399, 415, 413

[56] References Cited

U.S. PATENT DOCUMENTS

| | | | |
|---|---|---|---|
| 2,811,700 | 10/1957 | Kuch | 200/153 M |
| 3,476,895 | 11/1969 | Traxler | 200/61.19 |
| 3,654,411 | 4/1972 | Wohnlich et al. | 200/61.19 |
| 3,920,927 | 11/1975 | De Luca | 179/98 |
| 3,976,850 | 8/1976 | Faber et al. | 361/399 |
| 4,017,768 | 4/1977 | Valere | 179/98 |
| 4,087,648 | 5/1978 | Giacoppo | 179/98 |
| 4,122,313 | 10/1978 | De Luca | 179/98 |
| 4,127,748 | 11/1978 | Gilliemont | 179/98 |

FOREIGN PATENT DOCUMENTS 2399143 3/1979 France ................................. 200/61.19

*Primary Examiner*—Gerald L. Brigance
*Attorney, Agent, or Firm*—J. E. Moorhouse

[57] ABSTRACT

A manual cutover apparatus activates a plurality of circuit boards in an equipment frame in a telephone switching facility. Each circuit board is provided with a manually operable switch for inhibiting the function of the circuit or disabling a line termination at the circuit board, while the switch is in contact with an elongated control member. The control member spans the board locations in the frame and is held in place by slots in a connector shroud at each board position. When the frame is empty of circuit boards, the control member is inserted into slots in the equipment frame. After the required circuit boards are placed in the frame, these boards are activated by the withdrawal of the control member through a hole in a frame member at one end of the frame. The switch includes a base with a pair of terminals and a cantilever spring switch member extending over a groove in the base. As the circuit board is inserted into the frame the control member is received in the groove, displacing the switch member and effecting switching between the terminals.

4 Claims, 6 Drawing Figures

TELEPHONE LINE CUTOVER APPARATUS AND SWITCH

The present invention relates to manual switch apparatus in the field of telephony and more particularly to apparatus for manually effecting rapid enabling of groups of circuits in a newly installed switching facility.

During the operation of transferring existing telephone lines to new terminations in a newly installed switching facility, telephone subscribers are without telephone service. Hence this cutover operation is typically performed with as much haste as possible and often at a time when telephone traffic is minimal.

In telephone switching facilities using wire spring relay equipment extra cutover contacts are not normally provided. The wire spring relay contacts associated with line appearances are blocked, prior to the cutover operation, by the insertion of individual contact blocking members. At a prearranged moment, the individual contact blocking members are manually removed one by one from the relays as rapidly as possible by the operating staff to effect cutover to the new switching facility. More recently, however, relays in switching facilities of newer design tend to be of the miniature or sealed miniature types. These miniature relays cannot be readily blocked in preparation for the cutover operation.

One solution to the problem of cutovers has been suggested in U.S. Pat. No. 4,122,313 granted Oct. 24, 1978 to Paul V. DeLuca, wherein printed wiring interconnect networks are alternately connected in one of two positions. The cutover operation is effected by individually transferring the interconnect networks from the one position to the other position. In this case the cutover hardware is provided at minimal expense. However in larger switching facilities this cutover arrangement is too time-consuming to be practical.

The present invention provides a cutover apparatus which is manually operable to cutover groups of line appearance in an equipment frame. In accordance with the present invention, manual switch apparatus activates a plurality of circuit boards lodged in a plurality of board locations in an equipment frame. An elongated control member spans the plurality of board positions and is removeably retained adjacent the board locations. One switch is mounted on each of the circuit boards. Each switch is mechanically held in a first state by the presence of the control member and thereby inhibits the functioning of the circuit board. The control member is removed manually to activate the plurality of circuit boards by allowing the switches to move to a second state.

In one arrangement, each switch is mounted adjacent a notch formed in the connector edge of the circuit board; this notch receives the control member. The switch includes two pairs of switch terminals connected to respective conductors on the circuit board and two switch members biased for connecting the respective pairs of terminals. A portion of each switch member extends over the notch such that insertion of the control member therein displaces the switch members, thereby opening the switch.

A switch in accordance with the invention is operable by the insertion or removal of a control member into the switch. The switch comprises a base having a groove formed in one side thereof for receiving the control member, a pair of terminals carried in the base, and a cantilever spring switch member extending from one terminal and adjacent the other terminal to a position over the groove. The switch member is displaced by contact with the control member, when it is inserted into the groove, to effect switching between the pair of terminals.

A preferred embodiment of the invention will now be described with reference to the accompanying drawings in which.

Figure 1:
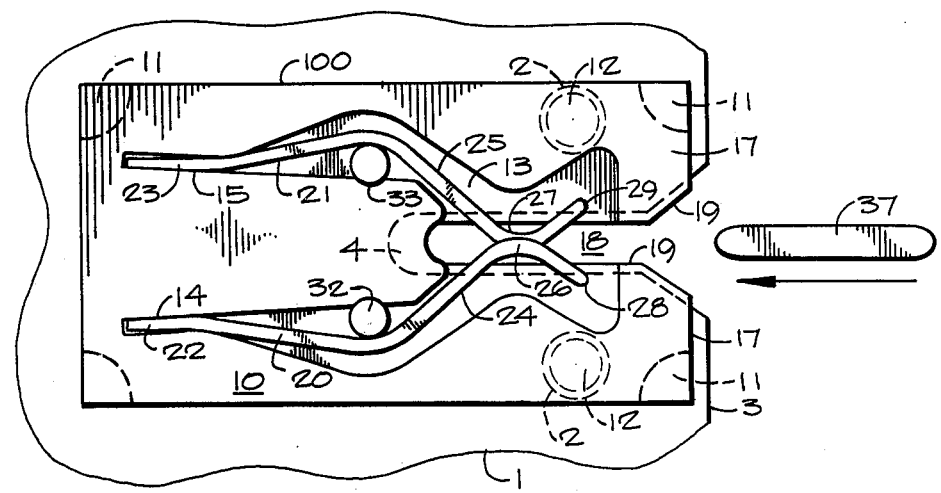
FIG. 1 is a plan view of a switch, according to the preferred embodiment of this invention, on a section of the circuit board.
Figure 2:
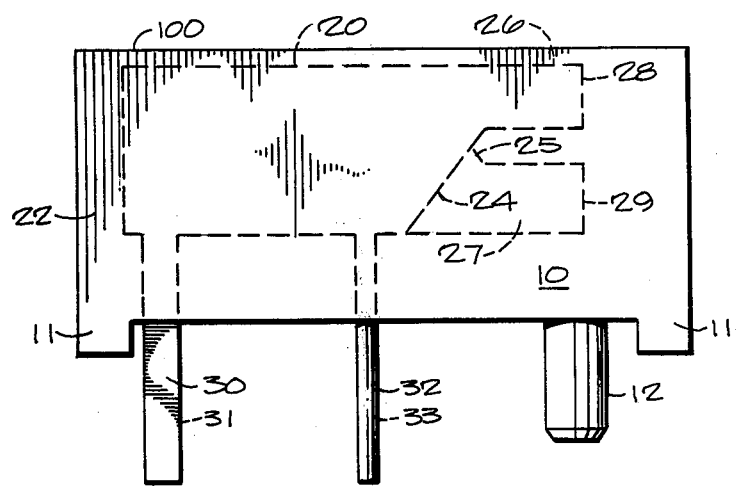
FIG. 2 is a side elevation view of the switch in FIG. 1.

Referring to FIG. 1, a manual switch 100 resides on a circuit board 1 having a pair of locating holes 2 formed therein. A connector edge 3 of the circuit board 1 includes a notch 4 for receiving an elongated control member 37, only one end of which is visible in FIG. 1. Referring also to FIG. 2, the switch 100 includes a base 10 which is formed from an electrically insulating material, for example a moldable thermoplastic or a castable resin material. Legs 11 project from the bottom of the base 10 and carry the base spaced from the surface of the circuit board 1. Guide pins 12 project from the base 10 and are retained in the pair of locating holes 2. The top of the base 10 has a cavity 13 formed therein which includes a pair of legs 14 and 15 disposed toward either side and extending toward one end of the base. Another end 17 of the base 10 is bisected by a groove 18 defined by a wall 19 extending from the bottom to the top of the base 10 and to the surface of the cavity 13. A pair of switch members are provided by electrically conductive cantilever springs 20 and 21 having terminal ends 22 and 23 lodged in the ends of the legs 14 and 15 respectively. Terminal legs 30 and 31 depend from the ends 22 and 23 respectively, through the bottom of the base 10. In FIG. 2, the terminal leg 31 is hidden by the terminal leg 30. The base 10 carries a pair of terminal posts 32 and 33 imbedded therein. In FIG. 2 the terminal post 33 is hidden behind the terminal post 32. The cantilever springs 20 and 21 are biased so that when at rest, electrical contact is maintained between the springs 20 and 21 and the terminal posts 32 and 33 respectively, providing a pair of BREAK contacts. The terminal legs 30 and 31 and the terminal posts 32 and 33 extend beyond the base a convenient distance for soldering to conductors, not shown, on the circuit board 10. The cantilever springs 20 and 21 extend beyond the terminal posts 32 and 33 through divergently tapered sections 24 and 25 respectively which are convergently angled toward the groove 18. Portions of reduced cross-section 26 and 27 extend over the groove 18 and curve outwardly toward terminating edges 28 and 29 respectively. It will be noted in reference to FIG. 2 that the extended portions 26 and 27 are laterally offset with respect to each other to prevent electrical contact therebetween. The switch is operated by inserting and removing the insulating control member 37 by way of the groove 18, between the extended portions 26 and 27. Inserting member 37 into groove 18 causes the cantilever spring members 20 and 21 to be displaced and thereby causes the electrical contacts between the leg 30 and the post 32 and between the leg 31 and the post 33 to be broken. The switch is restored to its rest state simply by removal of the control member 37.

The switch is described as including a base 10 which carries the various components of the switch. However, it is envisaged in an alternate embodiment (not the preferred embodiment) that the cantilever springs 20 and 21, the terminal legs 30 and 31 and the terminal posts 32 and 33 be mounted directly on the circuit board surface. In this case the terminal legs 30 and 31 are preferably rectangular in cross-section. Alternately, additional guide pins are positioned in the circuit board intermediate the terminal legs 30 and 31 and the terminal posts 32 and 33 to effect the required cantilever spring action.

Figure 3:
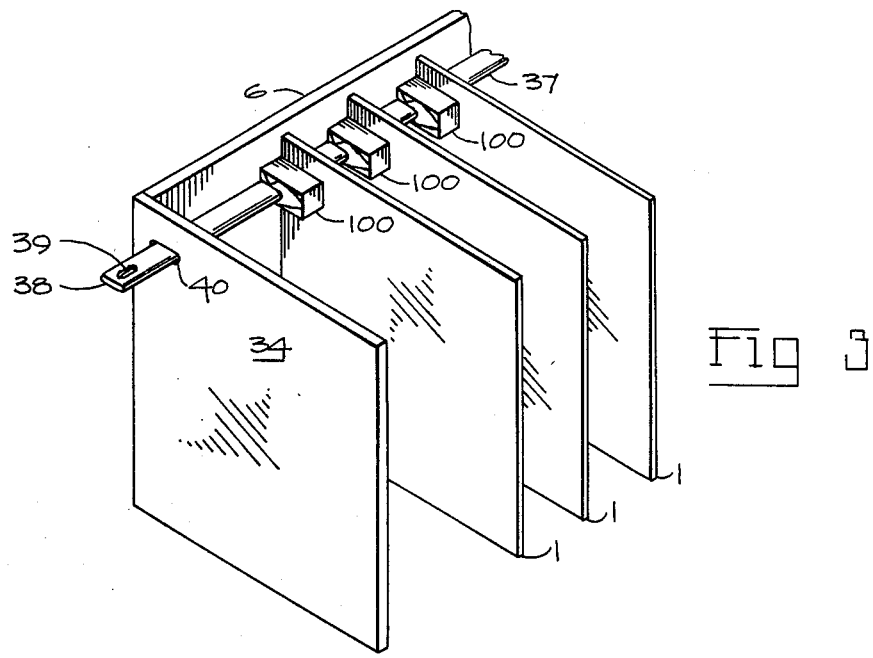
FIG. 3 is a simplified pictorial view of a cutover apparatus, according to the preferred embodiment of this invention and serving a plurality of circuit boards in an equipment frame, using the switch as shown in FIGS. 1 and 2.

In FIG. 3, various mechanical frame members, connectors, wiring and electronic components are omitted for the sake of clarity in the illustration of this embodiment of the invention. A plurality of circuit boards 1 in the equipment frame are lodged against a back plane 6, at predetermined circuit board locations. A frame member 34 is fastened to one end of the back plane 6. Each of the circuit boards 1 carries circuitry, not shown, appropriate for the termination of signal transmission lines carried on the back plane 6. Switches 100 each correspond to the switch 100 in FIGS. 1 and 2 and provide an enabling function for the circuit boards. A plastic strip in an elongated form serves as the control member 37. The control member 37 spans the circuit board locations and includes an end portion 38 which protrudes through the frame member 34 via an opening 40. During installation of the equipment frame in a new switching facility, the control member 37 is put into position before any of the circuit boards 1 are inserted into the frame. With the insertion of each circuit board, the contacts in the switch 100 are opened to inhibit the termination of the signal transmission lines on the back plane 6. The signal transmission lines typically provide for the termination of respective subscriber loops in a telephone switching office, however these lines are not restricted solely to this function as they may be used, for example, in trunk line functions or in control line functions. At the moment, when a new installation of the equipment in FIG. 3 is to be cut over, the control member 37 is manually grasped at the end 38 and rapidly pulled from the equipment frame. It should be noted that the initial placement of the control member is effected in the absence of the circuit boards 1. An opening 39 in the control member 37, adjacent the end portion 38, provides for the linking of a plurality of control members 37 in a group of vertically stacked equipment frames, not shown. By this means the circuit boards in the group of equipment frames are activated in one motion.

Figure 4:
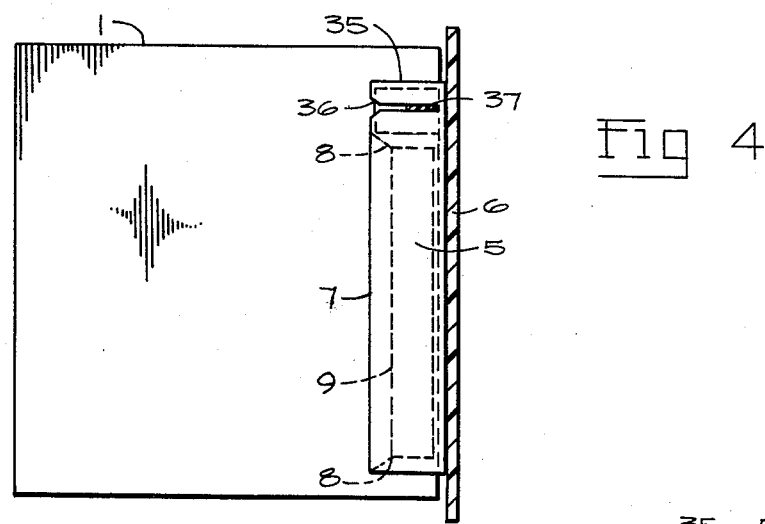
FIG. 4 is a plan view of one of the circuit boards in FIG. 3.
Figure 5:
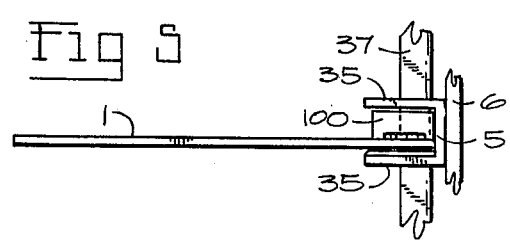
FIG. 5 is a top view of the circuit board in FIG. 4.

Referring to FIGS. 4 and 5, the circuit board 1 is connected to the back plane 6 by well known means which for example includes a shroud 5 having side walls 7 terminated at slotted end walls 8. The shroud 5 is fastened to the back plane 6 by any convenient means. The side and end walls 7 and 8 define a cavity in the shroud 5 for receiving a connector 9 mounted on the circuit board 1. Connection between the connector 9 and the back plane 6 is effected by conductive pins, not shown, extending from the back plane and into the defined cavity in the shroud 5. Upon insertion of the circuit board 1 into a circuit board location on the back plane 6, the side and end walls 7 and 8 guide the connector 9 into alignment with the pins which are received by corresponding contacts in the connector 9 in a well known manner.

In provision for the cutover feature, the shroud 5 includes extension walls 35. The extension walls 35 are a continuation of the side walls 7 beyond the end wall 8 at one end of the shroud 5. The extension walls 35 are extended to define a cavity for receiving the switch 100 on the circuit board 1. Slots 36 formed in the extension walls are aligned to receive the control member 37 and provide support for its placement. The switch 100 is positioned and mounted on the circuit board 1 such that the alignment of the connector 9, effected by the end and side walls 8 and 7, causes the groove 18, shown in FIG. 1, to be aligned with the slots 36. In the presence of the control member 37 the insertion of the circuit board causes the switch members 20 and 21 to be moved apart thus putting switch 100 in the open state and disabling the circuit board 1.

The apparatus has been described as providing a group enabling function, using BREAK contacts provided in double pole single throw switches for the cutover of a telephone switching facility. By alternate arrangements of the switch contacts, MAKE or TRANSFER contacts can also be employed.

Figure 6:
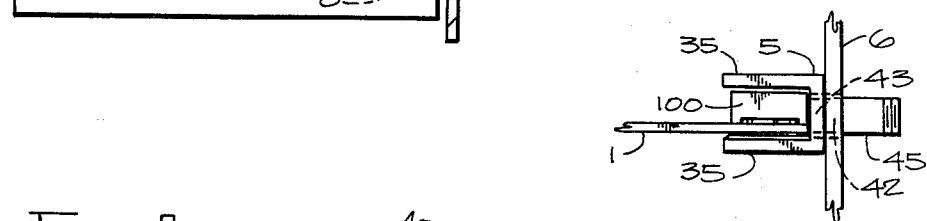
FIG. 6 is a top view of the circuit board similar to FIG. 5 and showing another embodiment.

In reference to FIG. 6 the alternate embodiment includes an opening 42 in the back plane 6 adjacent a circuit board location. This opening 42 corresponds to a similar opening 43 into the switch cavity in the corresponding shroud 5. The corresponding switch 100 is individually actuated in the absence of the control member 37 by insertion of a stick 45 through the openings 42 and 43, into the groove 18, and between the portions 26 and 27. The switch members 20 and 21 are thereby displaced by the stick 45 to cause the circuit board to be inhibited, or if so arranged to be operable in standby or test modes.

What is claimed is:

1. A manual switch apparatus in combination with an equipment frame having a back plane including back plane conductors, a plurality of circuit board locations distributed across a face of the back plane, each of the circuit board locations for removably lodging a circuit board therein, substantially perpendicular to the face of the back plane, and for providing electrical connections between the circuit board and a predetermined plurality of the back plane conductors, the manual switch apparatus comprising:

an elongated control member of a length more than spanning the plurality of circuit board locations;

a plurality of aligned slot formations distributed across and carried adjacent said face of the back plane, for removably retaining the elongated control member adjacent the circuit board locations;

a switch means, having first and second states, mounted at a predetermined location on each of a plurality of circuit boards lodgable within the plurality of circuit board locations, each switch means including at least one switch member for contacting the elongated control member;

whereby, upon insertion of each one of the plurality of circuit boards into the equipment frame, the associated switch means is mechanically switched to said second state in response to contact of the switch member against the elongated control member, and whereby removal of the elongated control member is restricted to a direction substantially in parallel relationship with the face of the back plane, such removal causing each of the switch means to be switched from the second state to the first state through sequential loss of contact by said switch members with the elongated control member.

2. A manual switch apparatus as defined in claim 1 wherein the equipment frame includes a rectangular shroud fixed adjacent the face of the back plane at each circuit board location, the rectangular shroud including a pair of side walls terminated at opposite end walls, said walls defining an elongated rectangular opening for receiving a connector edge of a circuit board, the manual switch apparatus further comprising:

an extension of at least one of said side walls beyond one of the end walls, the extension of the side wall having a slot formed therein, whereby one of said aligned slot formations is provided at each of the circuit board locations.

3. A telephone line cutover apparatus in an equipment frame having a plurality of telephone lines electrically connected to circuit board conductors on a plurality of corresponding line circuit boards mounted at circuit board locations in the frame, the cutover apparatus comprising:

an elongate control member of a length spanning a group of the circuit board locations;

a notch, formed in the connector edge of each line circuit board, for receiving the control member;

a mechanically operable switch mounted adjacent the connector edge of each line circuit board and including a base having a groove formed in one end of the base for receiving the control member, first and second pairs of said terminals being carried in the base, first and second movable switch members associated with the first and second pairs of terminals, the first and second switch members comprising first and second cantilever springs, portions of which extend convergently over the groove and further extend divergently toward terminal edges, said portions being laterally spaced one from the other; the movable switch members biased toward a MAKE switch position for electrically connecting the respective pairs of terminals, the laterally spaced portions of the switch members effecting a BREAK switch position, when displaced by the elongated control member, for electrically disconnecting the respective pairs of terminals;

in each of said circuit board locations, a switch receptacle for receiving one of the mounted switches, the switch receptacle being defined by a pair of spaced walls, each wall having a slot formed therein, said slots being aligned for receiving the elongated control member; and the equipment frame characterized by a frame member having an opening therein aligned with said slots, to permit withdrawal of the control member from the slots and the notches and thereby causing said switches to connect each telephone line to a respective one of the line circuit boards.

4. A switch actuated by the insertion or removal of a control member into the switch and comprising: a base having a groove formed in one side thereof for receiving the control member; first and second pairs of terminals carried in the base and corresponding first and second cantilever spring switch members arranged in complementary orientation; such that respective portions of the switch members extend beyond the terminals convergently toward the groove and curve over the groove to extend divergently away from the groove toward terminating edges, the respective portions of the switch members over the groove being laterally spaced one from the other to prevent metallic contact one with the other, the switch members being displaced by contact with the control member, when it is inserted into the groove, to effect switching between the pairs of terminals.

* * * * *